(12) United States Patent
Dortschy et al.

(10) Patent No.: US 8,238,545 B2
(45) Date of Patent: Aug. 7, 2012

(54) METHOD AND ARRANGEMENT FOR POWER MINIMIZATION IN A MULTI-TONE TRANSMISSION-BASED COMMUNICATION SYSTEM

(75) Inventors: Boris Dortschy, Hägersten (SE); Jaume Rius i Riu, Vällingby (SE); Moraes Rodrigo Bastos, Belem (BR); Aldebaro Klautau, Belem (BR); Ronaldo Zampolo, Belem (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 717 days.

(21) Appl. No.: 12/444,823

(22) PCT Filed: Oct. 11, 2006

(86) PCT No.: PCT/SE2006/050396
§ 371 (c)(1),
(2), (4) Date: Apr. 8, 2009

(87) PCT Pub. No.: WO2008/044975
PCT Pub. Date: Apr. 17, 2008

(65) Prior Publication Data
US 2010/0104090 A1 Apr. 29, 2010

(51) Int. Cl.
*H04M 1/00* (2006.01)
*H04J 1/00* (2006.01)
(52) U.S. Cl. ................... 379/399.01; 370/480
(58) Field of Classification Search ............. 379/399.01
See application file for complete search history.

(56) References Cited

OTHER PUBLICATIONS

Cendrillon, R. et al. "Iterative Spectrum Balancing for Digital Subscriber Lines", IEEE International Conference on Communications, ICC, May 16-20, 2005, vol. 3, p. 1937-1941, see p. 1938, col. 2-p. 1939, col. 1, algorithm 2, abstract.
Lee, Jungwon et al, "Multiuser Bit Loading for Multicarrier Systems" IEEE Transaction on Communications, Jul. 2006, vol. 54, No. 7, p. 1170-1174, see p. 1170, col. 2-p. 1172, col. 1, abstract.
Seong, Kibeom et al, "Optimal Resource Allocation for OFDMA Downlink Systems", IEEE International Symposium on Information Theory, Jul. 9-14, 2006, p. 1394-1398, see p. 1397, col. 1-page 1398. col. 1, abstract.
Yu, Wei et al, "Dual Methods for Nonconvex Spectrum Optimization of Multicarrier Systems", IEEE Transaction on Communications, Jul. 2006, vol. 54, No. 7, p. 1310-1322, see p. 1311, col. 2-page 1312, col. 2 abstract.
Tsfiaflakis, P. et al. An Efficient Lagrange Multiplier Search Algorithm for Optimal Spectrum Balancing in Crosstalk Dominated xDSL Systems. ESAT-SISTA/TR 05-173. Aug. 23, 2005.
Cendrillon, R. et al. Optimal Multiuser Spectrum Balancing for Digital Subscriber Lines. IEEE Transactions on Communications; vol. 54, No. 5. May 1, 2006.

*Primary Examiner* — Walter F Briney, III (57) ABSTRACT

A method and transmitter unit in a multi-tone multi-line based transmission system such as a digital subscriber line system for determining a Power Spectral Density (PSD) of a plurality of users over a physical channel for at least one tone. Each of the users has a minimum required data rate and a maximum allowed power. A Power Minimization Problem (PMP) is formulated mathematically introducing Lagrangian multipliers and by utilizing a dual decomposition approach for the objective function of the PMP in order to solve the PMP on a per-tone basis.

10 Claims, 7 Drawing Sheets

METHOD AND ARRANGEMENT FOR POWER MINIMIZATION IN A MULTI-TONE TRANSMISSION-BASED COMMUNICATION SYSTEM

TECHNICAL FIELD

The present invention relates to a multi-tone transmission-based communication system such as a Digital Subscriber Line (DSL) system. In particular, it relates to a method and arrangement for power minimizing spectrum balancing.

BACKGROUND

Multi-tone-based communication systems such as Digital Subscriber Line (DSL) systems are widely used as a last-mile solution to provide internet access to end users. In these systems, data is transmitted through the copper pairs traditionally used only for telephony. By using the existing infrastructure to provide broadband access, DSL systems are an attractive and cost-effective solution to last-mile access. Example DSL technologies (sometimes called xDSL) include High Data Rate Digital Subscriber Line (HDSL), Asymmetric Digital Subscriber Line (ADSL), a version of DSL with a slower upload speed, Very-high-bit-rate Digital Subscriber Line (VDSL).

Figure 1:
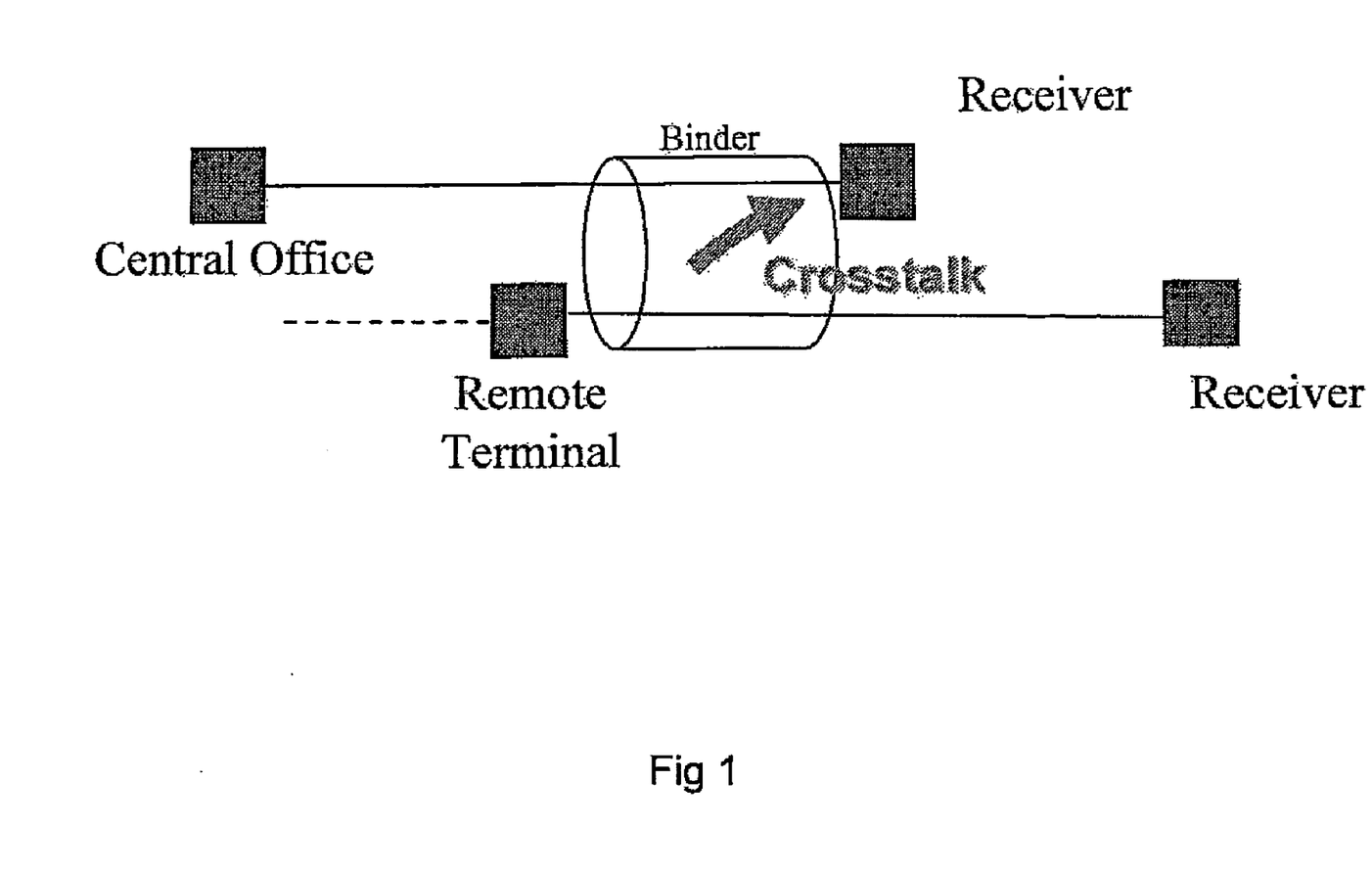
FIG. 1 illustrates crosstalk originated in a Remote Terminal in a typical DSL system.

The copper pairs used by DSL systems are usually deployed in binders, which may contain dozens of copper pairs. The proximity of the pairs results in electromagnetic coupling, so that signals from one line interfere with the others. This impairment is known as crosstalk, and is one of the main factors limiting the achievable data rates and reach in DSL systems. Crosstalk can be interpreted as the signal of one line leaking to all neighbouring lines as shown in FIG. 1. In fact, crosstalk originated in Remote Terminals can overwhelm the transmission on longer lines in a disadvantageous topology, as shown in FIG. 1, when the transmission origin from a Central Office. This problem could reduce data rates of less privileged users in such a way that only a limited set of services can be provided.

Crosstalk interference in a receiver of interest depends basically on two factors: the total transmitted Power Spectral Densities (PSDs) of all users except the user of interest and the coupling function from the transmitters to the receiver of interest.

Power Spectral Density (PSD) describes how the power of a signal is distributed with frequency. However, it should be noted that in the following description the PSD of a signal on a tone is approximated to the power carried by the signal.

There is no possible way to easily manipulate crosstalk gains in a binder, but it is however feasible to design the PSDs of the users in order to minimize crosstalk and maximize the data rates of the system. A strategy to optimize data rate, power and reach against each other is Dynamic Spectrum Management (DSM). DSM allows adaptive allocation of spectrum to various users in a multi-user environment as a function of the physical channel demographics to meet certain performance metrics. Application of DSM in present networks does not need any kind of new infrastructure and takes advantage of the plant as it is to intelligently perform management in the network.

However, finding an optimal solution for DSM problems is of high complexity. Due to power constraint, putting power on one tone affects the remaining power budget for the other tones on the same line. At the same time the power on one tone has a direct impact, due to crosstalk, to the performance on other lines, too. Therefore, the power on a tone affects not only the line the tone is used on, but all lines at all tones.

There are two approaches for the DSM in DSL systems: Rate Maximization Problem (RMP) and Power Minimization Problem (PMP). Thus, the RMP approach focuses on maximizing the data rates of the system given a power budget, whereas the PMP approach focuses on minimizing the power of the system guaranteeing a minimum data rate.

Now, consider a system with N users and K tones. A tone is a predetermined frequency range as with all multi-tone-based communication systems and different tones are presumed not to interfere with one another. The power of a user n on tone k used for transmission is denoted by $p_n^k$. The power of all users across all tones used for transmission is expressed by $$P_{(N \times K)} = \begin{bmatrix} p_1^1 & \cdots & p_1^K \\ \vdots & \ddots & \vdots \\ p_N^1 & \cdots & p_n^k \end{bmatrix}$$

P is a matrix, in which the upper left-corner element will denote the power of user 1 on the first tone. The lower right-corner element will denote the power of the N-th user on tone K. One row of P, which will be referred to by $P_n$, will represent the PSD of user n across all tones, i.e. $P_n = [p_n^1, p_n^2, \ldots, p_n^{K-1}, p_n^K]$. One column of P, which will be referred to by $P^k$, will represent the PSD of all users across one tone, i.e. $P^k = [p_1^k, p_2^k, \ldots, p_{N-1}^k, p_N^k]$.

The RMP focuses on finding the maximum data rate allowed with a limited power budget for each user in a system. It can be formulated as the task of finding a given matrix P as described above such that the data rate of a given user is maximized while all other users in the network achieve a minimum desired data rate $R_n^{min}$ respectively, while a limited power budget for each user is respected. The limited power budget for each user could also be expressed as there exist a maximum allowed transmit power of each user. In fact, in DSL standards PSD masks are defined that limit the transmit PSDs, which in turn limits the allowed transmit power of a user. The RMP has been the main research focus in recent DSM studies. In the following four well-known methods suited for solving the RMP will be discussed.

Firstly, a method called Optimal Spectrum Balancing (OSB) assumes convexity of the data rate region. OSB introduces Lagrange variables to formulate the problem mathematically and to be able to decouple the problem across frequency by means of dual decomposition and solves a per-tone maximization to come up with results said to be optimal for the RMP. However, it needs centralized processing and enjoys high complexity. Furthermore, it is only feasible for networks of a maximum of four users. The OSB algorithm is described in "Optimal Multi-user Spectrum Management for Digital Subscriber Lines", Cendrillon et al, Proc. IEEE International Conference on Communications (ICC), Paris, 2004, pp. 1-5. The OSB method is also disclosed in the patent application EP1492261.

Secondly, an iterative version of the OSB method called Iterative Spectrum Balancing (ISB) method is disclosed in "Iterative Spectrum Balancing for Digital Subscriber Lines", Cendrillon et al, IEEE International Conference on Communications (ICC), 2005, pp. 1937-1941. It can be interpreted as a middle-ground between some of the most advantageous aspects of IWF (described below) and OSB. From IWF it inherits its iterative nature and from OSB the use of Lagrange variables, dual decomposition and a weighted rate-sum. It has reduced complexity. Hence, ISB is feasible for larger networks and provide near-optimal results. However, it is a centralized solution as OSB.

Thirdly, the algorithm called Successive Convex Approximation for Low-Complexity (SCALE) utilizes a convex approximation of the original non-convex objective function and iterates through the function until this approximation is as close as possible to the original formulation. As OSB, it also uses Lagrange variables and a weighted rate-sum. It enjoys distributed implementation, low complexity and near optimal performance. The SCALE algorithm is described in "Low-Complexity Distributed Algorithms for Spectrum Balancing in Multi-User DSL Networks", Papandriopoulos et al, 2005.

Lastly, the Iterative Water-filling (IWF) algorithm is one of the first published spectral optimization algorithms. By proper formulation of the objective function both RMP and PMP can be addressed. For the RMP the IWF algorithm uses the water-filling solution iteratively across the network with each user utilizing a power budget to achieve a maximum data rate. For the PMP the IWF algorithm uses the water-filling solution iteratively across the network with each user utilizing the minimum power necessary to achieve a minimum data rate. Iterative water-filling employs an iterative procedure whereby each transmitter applies the classical water-filling solution, i.e. increases or decreases its own power allocation, in turn until a convergence point is reached. It enjoys low complexity and autonomous implementation, i.e. the processing is distributed in the network. The IWF algorithm is disclosed in "Distributed multiuser Power Control for Digital Subscriber Lines," Yu et al, IEEE Journal on Selected Areas of Communications, vol. 20, pp. 1105-1115, 2002.

The PMP problem has not been addressed as often as the RMP problem. The PMP can be formulated as the task of finding a set of optimized PSDs, i.e. a given combination of power allocations in the P matrix, across all tones as to minimize total power allocated in the system such that a given set of minimum required data rates is achieved. That is, $$P = \underset{P}{\operatorname{argmin}} \sum_n P_n^{tot} \quad (1)$$

$$P_n^{tot} = \sum_k p_n^k$$

such that $R_n \geq R_n^{min}$ and $P_n^{tot} \leq P_n^{max} \forall n$ in which the minimum required data rates $R_n^{min}$ are used as markers for the optimized PSDs. Further, $P_n^{tot}$ is the total allocated power of user n across all tones, i.e. the sum of all elements in vector $P_n$. $P_n^{max}$ is the maximum allowed power of user n across all tones and $R_n$ is the achieved data rate for user n.

In order to solve a problem an objective-function associated with the nature of the problem can be used. The objective-function determines how well a given solution solves the problem. The objective-function of the PMP (1) can be written as a weighted power sum minimization with a given set of weighting factors $w_n$ to be determined properly, $$P = \underset{P}{\operatorname{argmin}} \sum_n w_n P_n^{tot} \quad (2)$$

such that $R_n \geq R_n^{min}$ and $P_n^{tot} \leq P_n^{max} \forall n,$ in which $w_n$ is the weight or priority of user n. The sum of the weights of all users is constant, $$\sum_n w_n = C, C = \text{constant.}$$

The OSB, ISB and SCALE methods would need additional steps of calculations for solving the PMP as expressed in equation (2). Hence, the complexity would increase and the convergence speed would decrease which would make them unsuitable for solving the PMP.

Even though the IWF method was introduced as one way to solve the RMP, the IWF method is highly sub-optimal for this purpose because it does not take the impact of changes onto other lines into account.

SUMMARY

Therefore, the object of the present invention is to achieve an improved method and arrangement for power minimizing spectrum balancing.

The objective problem is how to find a set of PSDs, i.e. a combination of power allocations in the matrix P, across all tones as to minimize total power allocated in the system such that a set of minimum required data rates is achieved.

According to a first aspect the present invention relates to a method in a multi-tone transmission-based communication system for determining a PSD of a plurality of users over a physical channel for at least one tone. Each of said plurality of users has a minimum required data rate and has a maximum allowed power. The method comprising the steps of a) initializing a weight, $w_n$, for each user, b) initializing a Lagrange multiplier, $\mu_n$, for each user, c) determining a PSD over said physical channel for at least one tone in a way that said PSD over said physical channel for each tone minimizes a Lagrangian formulation regarding power and whereby the Lagrangian formulation comprises the weight and the multiplier, d) determining an achieved data rate for each user based on the determined PSD, e) adjusting the Lagrange multiplier of each user, f) iterating c) to e) until the achieved data rate of each user is equal to the minimum required data rate of each user respectively, g) determining the total allocated power of each user h) adjusting the weight of each user, and i) iterating through the steps of c) to h), until the total allocated power of each user on at least one tone is less than or equal to the maximum allowed power of each user, is an improved solution of the PMP problem in multi-line communication system.

According to a preferred embodiment, the Lagrangian formulation is a summation of the power of each user on said tone of all users multiplied with the weight, $w_n$, subtracted with a summation of the bit-loading of each users on said tone of all users multiplied with the Lagrange multiplier, $\mu_n$.

Preferably, the Lagrange multiplier, $\mu_n$, is adjusted according to the difference between the achieved data rate and the minimum required data rate multiplied by a step value. In addition, the weight of each user, $w_n$, is adjusted according to the difference between the total transmit power of the user across all tones and the maximum allowed power of the user multiplied by a step value.

According to a second aspect the present invention relates to a transmitter unit adapted for determining a PSD of a plurality of users over a physical channel for at least one tone. Each of said plurality of users has a minimum required data rate and has a maximum allowed power. The transmitter unit comprises initializing means for initializing a weight, $w_n$, for each user, initializing means for initializing a Lagrange multiplier, $\mu_n$, for each user and determining means for determining a PSD over said physical channel for at least one tone in a way that said PSD over said physical channel for each tone minimizes a Lagrangian formulation regarding power, and for determining an achieved data rate for each user based on the determined PSD. The Lagrangian formulation comprises the weight and the multiplier. The transmitter unit further comprises adjusting means for adjusting the Lagrange multiplier of each user, a first controller adapted to control repeatedly operation of the means for determining and means for adjusting, until the achieved data rate of each user is equal to the minimum required data rate of each user respectively, determining means for determining the total allocated power of each user, adjusting means for adjusting the weight of each user, and a second controller adapted to control repeatedly operation of the means for determining the said PSD and said achieved data rate and means for adjusting the Lagrange multiplier and the first controller and means for determining the total allocated power of each user and means for adjusting the weight of each user, until the total allocated power of each user on at least one tone is less than or equal to the maximum allowed power of each user.

According to a preferred embodiment, said Lagrangian formulation is a summation of the power of each user on said tone of all users multiplied with the weight, $w_n$, subtracted with a summation of the bit-loading of each users on said tone of all users multiplied with the Lagrange multiplier, $\mu_n$.

Preferably, the Lagrange multiplier, $\mu_n$, is adjusted according to the difference between the achieved data rate and the minimum required data rate multiplied by a step value. In addition, the weight of each user, $w_n$, is adjusted according to the difference between the total transmit power of the user across all tones and the maximum allowed power of the user multiplied by a step value.

The present invention presents a solution for the PMP problem associated with multi-tone transmission. Thus, the objective problem is solved by using the method of the present invention whereby the PSDs, which serve a given data rate and transmit power constraints using the minimum required transmission power within the network, can be found. The method is trustable, stable and convergence is found for every case analysed. The method is clearly optimal in terms of the PMP. The method can navigate through the whole area of feasible point in the data rate region without restrictions iterating in two loops. Other state-of-the-art DSM solutions could also do so, but only with additional complexity by the addition of an external loop. This implies that the present invention is the least complex known scheme able to map the whole data rate region with no limitations.

In contrast to existing solutions, the present invention will always assign the smallest transmit power necessary for a given operational point in the feasible data rate region. The spare power resulting from this reduction can be used for increasing noise margin or just reducing power consumption in the network. Being able to achieve all points in the data rate region, the method allows the system operator to have a higher degree of flexibility in resource management in the network, i.e. data rate versus reach, power versus noise margin, can be more easily and precisely controlled.

Additionally, the present invention is possible to implement in existing networks, which have a Spectrum Management Center (SMC), in which all processing is done, available.

BRIEF DESCRIPTION OF THE DRAWINGS

The invention will in the following be described in more detail with reference to enclosed drawings, wherein.

DETAILED DESCRIPTION

In the following description, for purposes of explanation and not limitation, specific details are set forth, such as particular sequences of steps, signalling protocols and device configurations in order to provide a thorough understanding of the present invention. It will be apparent to one skilled in the art that the present invention may be practised in other embodiments that depart from these specific details.

Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The basic idea of the present invention is implemented by formulating the PMP (1) mathematically, introducing Lagrangian multipliers and by using a dual decomposition approach of the objective-function of PMP (2) in order to solve the PMP on a per tone basis. The Lagrangian multipliers can be used to find the extremum of a function subject to constraint. The use of Lagrangian multipliers in optimization theory is disclosed, for example, in S Boyd and L Vandenberghe, "Convex Optimization", Cambridge University Press 2004. In the present invention the exhaustive search in the P matrix as previously described is avoided by decomposing the search into tone independent searches.

Solving convex problems with the use of Lagrangian multipliers and dual decomposition is a well-known and widely used method. Recently it has been shown that some non-convex problems can also be optimally solved with the mentioned tools. The condition is that channel response should be a slowly varying function of frequency, i.e. channel responses in neighbouring tones should present smooth variation. DSL systems, in which tone-spacing is sufficiently small, satisfy this condition. The present invention profits from this fact in order to develop an improved solution to the PMP.

In the following description further details regarding the introduction of Lagrangian multipliers and the dual decomposition of the objective-function used in the inventive method will be given.

The method starts with the step of rewriting the objective-function of PMP (2) in its Lagrangian dual domain, L, that is in the domain of the dual problem whereof the primal problem is the PMP (1), as:

$$P = \underset{\hat{p}}{\arg\min} L \qquad (3)$$
$$= \underset{\hat{p}}{\arg\min}\left[\sum_n w_n P_n^{tot} + \sum_n \mu_n (R_n^{min} - R_n)\right],$$

where $\mu_n$ is a Lagrange multiplier. Equation (3) would still require a complete exhaustive search through all possible combinations of transmit power of all users across all tones in the P matrix, i.e. a global search.

However, it is possible to optimally solve the PMP by decomposing the Lagrangian dual (equation (3)) complete global exhaustive search through the whole P matrix into local exhaustive searches through columns of the P matrix as will be described below.

Firstly, a per tone Lagrangian formulation, $L^k$, is introduced:

$$P^k = \underset{\hat{p}^k}{\arg\min} L^k \qquad (4)$$
$$= \underset{\hat{p}^k}{\arg\min}\left[\sum_n w_n \hat{p}_n^k + \sum_n \mu_n R_n^{min} - \sum_n \mu_n b_n^k\right],$$

where $p_n^k$ is, as previously described, the power of a user n on tone k used for transmission and $b_n^k$ is the bit-loading for user n on tone k, i.e. how many bits user n transmits in tone k.

Figure 5:
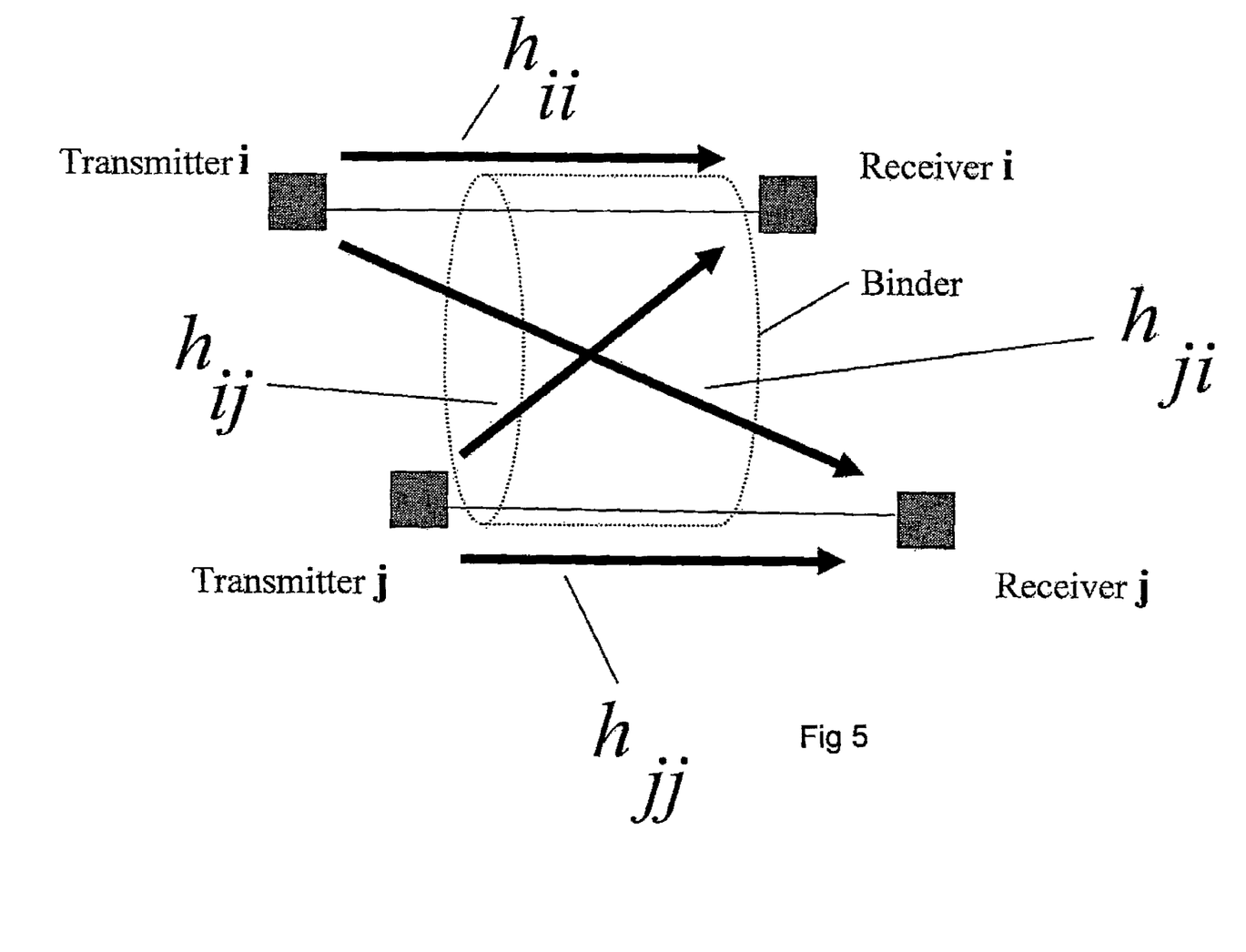
FIG. 5 shows the definition of the channel labelling for a two-line scenario.

The bitloading $b_n^k$ depends in principle on the $p_n^k$ by $$b_n^k = \log_2(1 + \alpha \cdot SNR_n^k)$$

wherein $\alpha$ is a given system-design parameter and the Signal-to-Noise-Ratio $SNR_n^k$ for user n on tone k is the ratio of received power of the information signal and the noise level on this tone. The noise in tone k for user n is determined by the background noise $\sigma_n^k$ plus the crosstalk noise of all lines with index $m \neq n$.

$$SNR_n^k = \frac{p_n^k \cdot |h_{nn}^k|^2}{\sigma_n^k + \sum_{m \neq n} p_m^k \cdot |h_{nm}^k|^2}$$

where $h_{ij}^k$ is the value of the transfer function between transmitter j and receiver i on tone k, as illustrated in FIG. 5. Since the bitloading equation above does not allow integer solutions in practice a rounded-down version can finally be applied.

The data rate of the n-th user can be calculated as $$R_n = f_s \sum_k b_n^k,$$

where $f_s$ is the standardized Discrete Multi-Tone (DMT) symbol rate. As $f_s$ is a constant term it does not interfere in the optimization. Consequently, it can be ignored in the formulation. Also, the term $$\sum_n \mu_n R_n^{min}$$

can be ignored in the above formulation because it is constant on the PSD of all users across one tone, $P^k$. Hence, equation (4) is reduced to $$P^k = \underset{\hat{p}^k}{\arg\min} L^k \qquad (5)$$
$$= \underset{\hat{p}^k}{\arg\min}\left[\sum_n w_n \hat{p}_n^k - \sum_n \mu_n b_n^k\right].$$

Equation (5) reduces the original problem into a smaller sub-problem, only concerned with one single tone. The outcome of the minimization above would be a vector containing the PSD of all users for a given tone k, i.e. the equivalent of one column in the original P matrix. Consequently, the equation (5) must be evaluated for every tone so that the P matrix can be fully acknowledged.

In order to show that the solution of the original problem and the solution of the dual decomposition are the same, equation (3) is written as $$P = \underset{\hat{p}}{\arg\min} L \qquad (6)$$
$$= \underset{\hat{p}}{\arg\min}\left[\sum_n w_n P_n^{tot} + \sum_n \mu_n R_n^{min} - \sum_n \mu_n R_n\right].$$

Again, the middle term, $$\sum_n \mu_n R_n^{min},$$

in equation (6) is constant on the P matrix and hence, can be neglected from the formulation. Now consider a per tone decomposition of equation (6) as $$P = \underset{\hat{p}}{\arg\min} L \qquad (7)$$
$$= \underset{\hat{p}}{\arg\min}\left[\sum_n w_n \sum_k \hat{p}_n^k - \sum_n \mu_n \sum_k b_n^k\right],$$

which can once again be rewritten $$P = \underset{\hat{p}}{\arg\min} L \qquad (8)$$
$$= \underset{\hat{p}}{\arg\min}\left[\sum_k \left(\sum_n w_n \hat{p}_n^k - \sum_n \mu_n b_n^k\right)\right]$$
$$= \underset{\hat{p}}{\arg\min}\left[\sum_k L^k\right]$$

Hence, the method makes it possible to solve the PMP by its dual domain decomposition for each tone. That is, the solution of the original problem and the solution of the dual decomposition are the same.

Equation (5) is the equation used in the present invention, since it is only necessary to evaluate every tone independently to come up with a complete optimal solution. In this manner, it is not necessary to search through all possible combinations of P, only to search through all combinations of $P^k$, that is one search for each tone. The method provides a large reduction in complexity. When the Lagrangian formulation, $L^k$, is minimized for each tone separately, the original objective-function of PMP (2) in its Lagrangian dual domain, L, is also minimized.

Furthermore, the bridge between the global minimization of PMP, i.e. over all tones, and the local minimization of equation (5), i.e. over one tone, is the Lagrange multiplier, $\mu_n$. The Lagrange multiplier, $\mu_n$, can be interpreted as a cost-scaling variable for bit-loading for user n, which means that if $\mu_n$ is increased, bit-loading will never decrease for any tone of user n.

In order to obtain the PSDs which serve a given data rate and transmission power constraints using the minimum required transmission power within the network, the steps below are performed according to the invention.

---

1. $w_n = 1/N \; \forall n$;
2. Initialise $\mu_n$ arbitrarily $\forall n$;
3. Repeat
4.     Repeat
5.         For k = 1:K,
6. 
$$P^k = \underset{p^k}{\mathrm{argmin}}\left[\sum_n w_n \hat{p}_n^k - \sum_n \mu_n b_n^k\right];$$

7.         $\mu_u = \mu_n + \epsilon_\mu (R_n^{min} - R_n) \; \forall n$;
8.     until $R_n = R_n^{min} \; \forall n$
9.     If $P_n^{tot} > P_n^{max} \; \forall n$,
10.         Error => The desired point is impossible;
11.     else,
12.         $w_n = w_n + \epsilon_w(P_n^{tot} - P_n^{max}) \; \forall n$;
13. until $P_n^{tot} \leq P_n^{max} \; \forall n$

---

In step 1, the weights of each user, $w_n$, are initialized and set to appropriate values, preferably values for which there is perfect equilibrium between users. Further in step 2, the Lagrange multipliers of each user, $\mu_n$, are initialized and set to arbitrary values.

The method consists of two loops. The innermost loop, step 4 to 8, converges once all data rates have reached their minimum desired values. For each sub-channel k (step 5), i.e. a tone in multi-tone-based communication systems, it is necessary to sweep through all the combinations in the $P^k$ space, i.e. the PSD of all users across one tone, and find a set that minimizes the Lagrangian formulation, $L^k$. Thus, the PSD of all users for each tone that minimizes the Lagrangian formulation, $L^k$, is determined, as shown in step 6.

The Lagrangian formulation, $L^k$, is formed by a weighted sum of the power of each user (the first term on the right-hand side in equation (5)) subtracted with the summation of the bit-loading of each user multiplied by the Lagrange multiplier $\mu_n$ (second term on the right-hand side in the equation (5)). The search space of the power of each user, $p_n^k$, is defined by the limits of the spectral masks in DSL standards. The bit-loading, $b_n^k$, is determined by the Signal-to-Noise-Ratio for user n on tone k, $SNR_n^k$, as described above. In addition, the achieved data rate, $R_n$, for each user is determined by the bit-loading, $b_n^k$.

The multiplier, $\mu_n$, in the summation of the bit-loading of each user is to be interpreted as a cost-scaling variable for bits per sub-channel. Thus, if $\mu_n$ for user n increases, more bits will be allocated, i.e. loaded, for every tone or if $\mu_n$ decreases, fewer bits will be allocated for every tone.

As can be seen in step 7, the multiplier $\mu_n$ is adjusted according to the difference between achieved data rate and minimum required data rate multiplied by a step value $\epsilon_\mu$. For convergence, each user must have the Lagrange multiplier, $\mu_n$, proportional to its minimum data rate. The multipliers $\mu_n$ can be initialised with any value, as shown in step 2. The multipliers will always converge to an optimal value for any possible minimum required data rates $R_n^{min}$ as they are updated. The method iterates through step 5 to 7 until the achieved data rate of each user is equal to the minimum required data rate of each user.

Further, the total allocated power of each user across all tones, $P_n^{tot}$, i.e. the sum of all elements in vector $P_n$, is determined. If the total allocated power of each user exceeds the maximum allowed power, $P_n^{max}$, the theoretical data rate capacity of operational points is exceeded and therefore not a feasible result. Otherwise, when the total allocated power of each user is less or equal with the maximum allowed power, $P_n^{max}$, an adjustment of the variable $w_n$ is performed, as shown in step 12.

The Lagrange variable, $w_n$, enables the negotiation of the best trade-off of channel resources among users. The weight, $w_n$, is adjusted according to the difference between the total allocated power of user n across all tones, $p_n^{tot}$, and the maximum allowed power of user n across all tones, $P_n^{max}$, multiplied by a step value $\epsilon_w$. (step 12). The method iterates through step 3 to 13 until the total allocated power of each user across all tones is less than or equal to the maximum allowed power of each user. Hence, at convergence of the outermost loop, step 3 to 13, a set of PSDs is found with the required data rate and power constraints satisfied.

It will be apparent to one skilled in the art that both the multiplier and the variable can be adjusted in many different ways as long as the adjustment is proportional to the difference between the achieved rate and power, respectively, and the desired rate and power, respectively. For instance, if the difference between the achieved data rate and minimum desired data rate is negative the multiplier could be decreased by a predetermined value and if the difference is positive is could be increased by a predetermined value.

Figure 6:
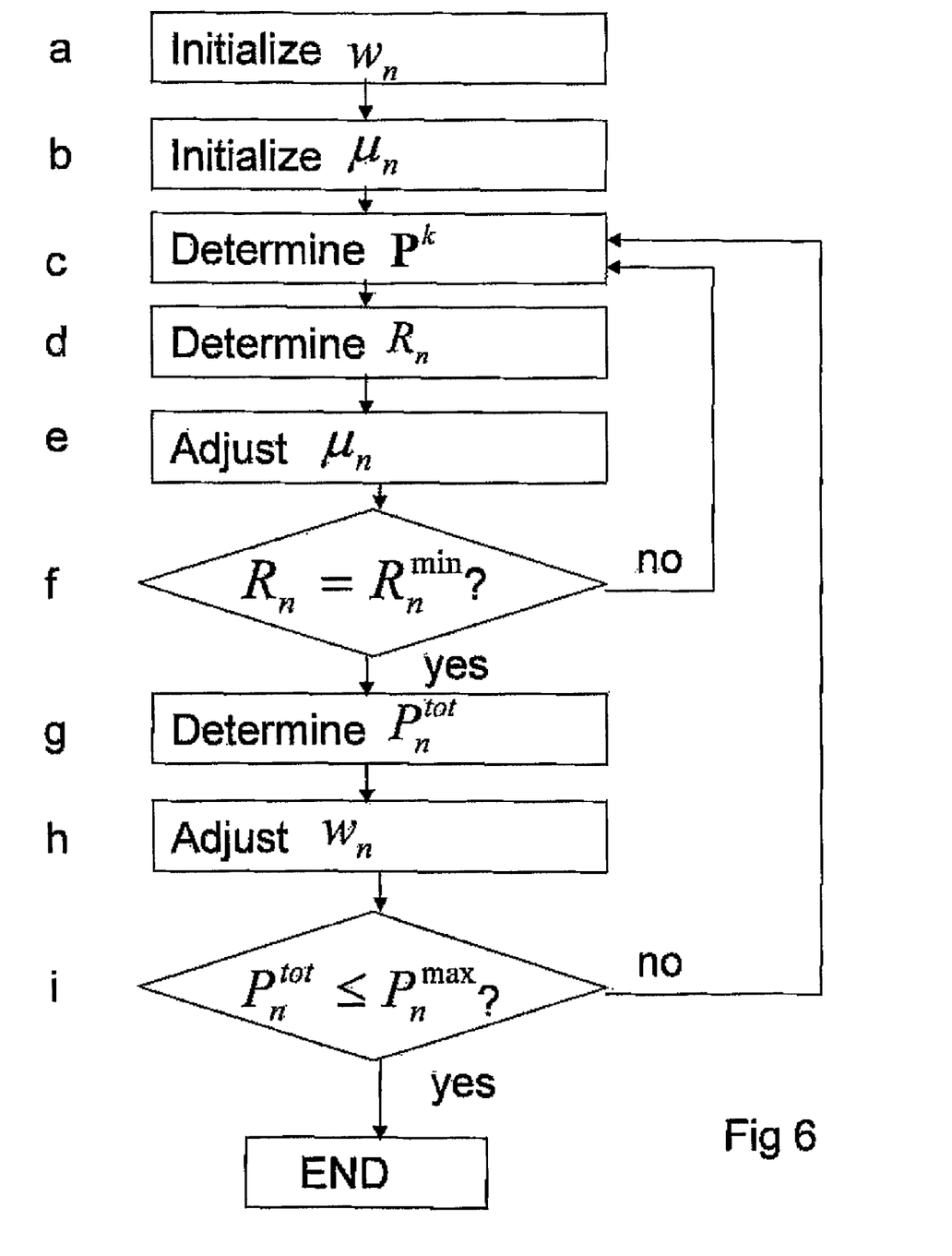
FIG. 6 illustrates the method by the flowchart according to the present invention.

Thus, the present invention relates to a method for power minimization in a multi-tone transmission-based communication system. The method according to the present invention is illustrated by the flowchart of FIG. 6 and comprises the steps of:

a) initializing a weight, $w_n$, for each user,
    b) initializing a Lagrange multiplier, $\mu_n$, for each user,
    c) determining a PSD over said physical channel for at least one tone in a way that said PSD over said physical channel for each tone minimizes a Lagrangian formulation regarding power and whereby the Lagrangian formulation comprises said weight and said multiplier,
    d) determining an achieved data rate for each user based on the determined PSD,
    e) adjusting the Lagrange multiplier of each user,
    f) iterating c) to e) until the achieved data rate of each user is equal to the minimum required data rate of each user respectively,
    g) determining the total allocated power of each user
    h) adjusting the weight of each user,
    i) iterating through the steps of c) to h), until the total allocated power of each user on at least one tone is less than or equal to the maximum allowed power of each user.

Figure 2:
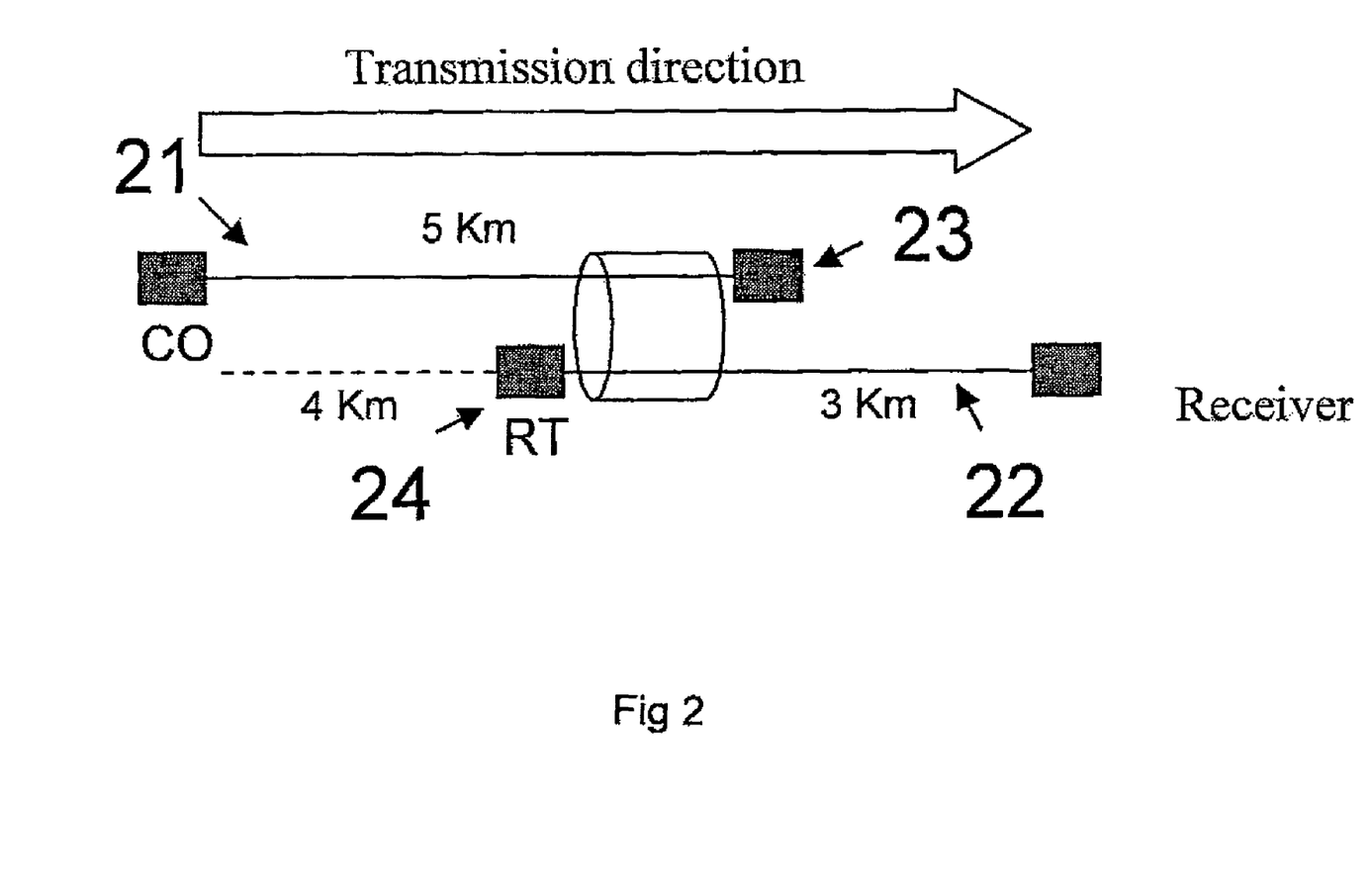
FIG. 2 depicts a scenario of interest in which the present invention is applicable.

Referring to FIG. 2, a scenario of interest is depicted, which will be used as a reference system in further description of the present invention. The scenario of interest in this case is a 2-user, i.e. two lines 21 and 22, downstream ADSL system, as shown in FIG. 2. This kind of topology is one of the most complicated for spectrum management since the downstream receiver of the Central Office (CO), i.e. the transceiver unit 23, experiences a large amount of crosstalk originated from the downstream transmitter of the Remote Terminal (RT), i.e. the transceiver unit 24.

Figure 7:
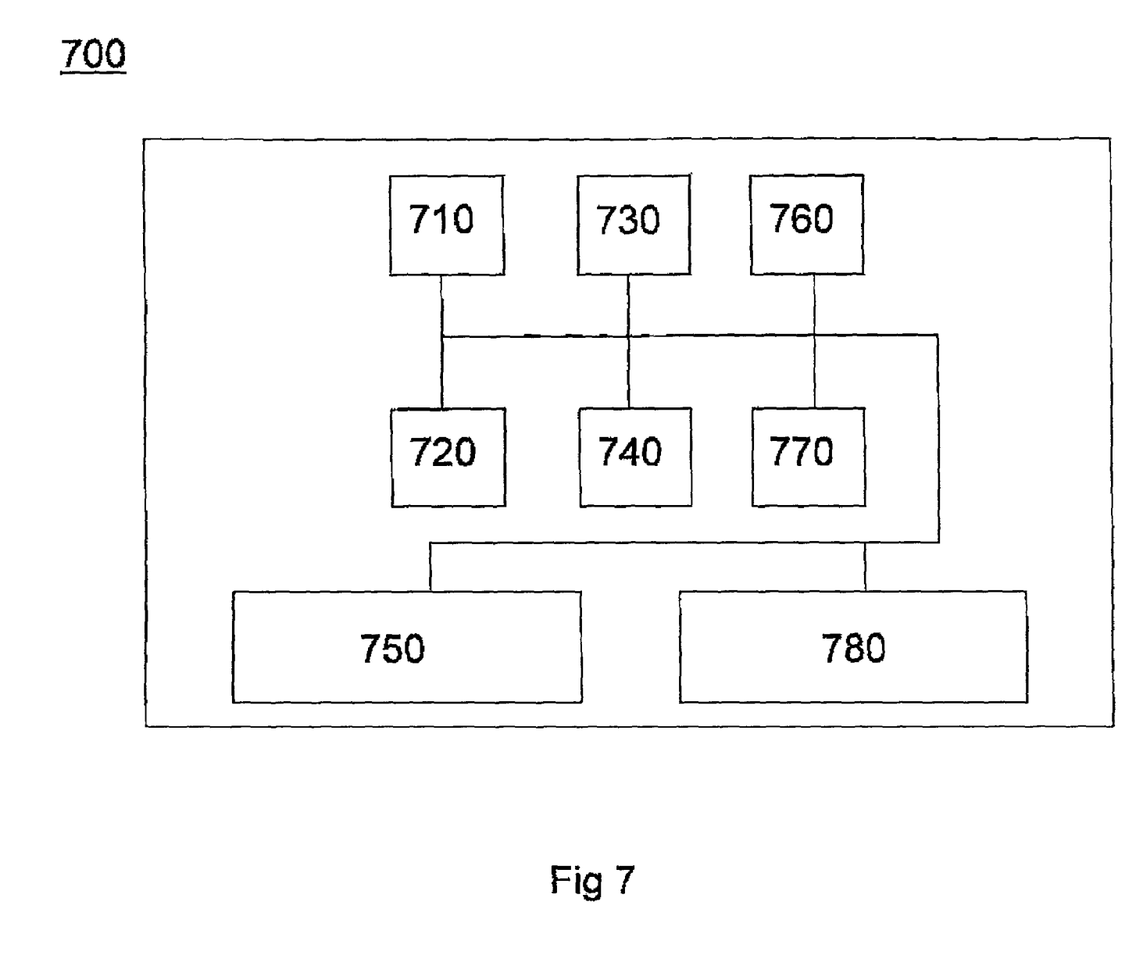
FIG. 7 shows the transmitter unit according to the present invention.

In FIG. 7, the transmitter unit 700 of the present invention is illustrated. The transmitter unit, for example located in a Central Office, is adapted for power minimization in a multi-tone transmission-based communication system and comprises:

initializing means 710 for initializing a weight, $w_n$, for each user, initializing means 720 for initializing a Lagrange multiplier, $\mu_n$, for each user, determining means 730 for determining a PSD over said physical channel for at least one tone in a way that said PSD over said physical channel for each tone minimizes a Lagrangian formulation regarding power and whereby the Lagrangian formulation comprises said weight and said multiplier and for determining an achieved data rate for each user based on the determined PSD, adjusting means 740 for adjusting the Lagrange multiplier of each user, a first controller 750 adapted to control repeatedly operation of the means for determining and means for adjusting, until the achieved data rate of each user is equal to the minimum required data rate of each user respectively, determining means 760 for determining the total allocated power of each user, adjusting means 770 for adjusting the weight of each user, a second controller 780 adapted to control repeatedly operation of the means for determining the said PSD and said achieved data rate and means for adjusting the Lagrange multiplier and the first controller and means for determining the total allocated power of each user and means for adjusting the weight of each user, until the total allocated power of each user on at least one tone is less than or equal to the maximum allowed power of each user.

Figure 3:
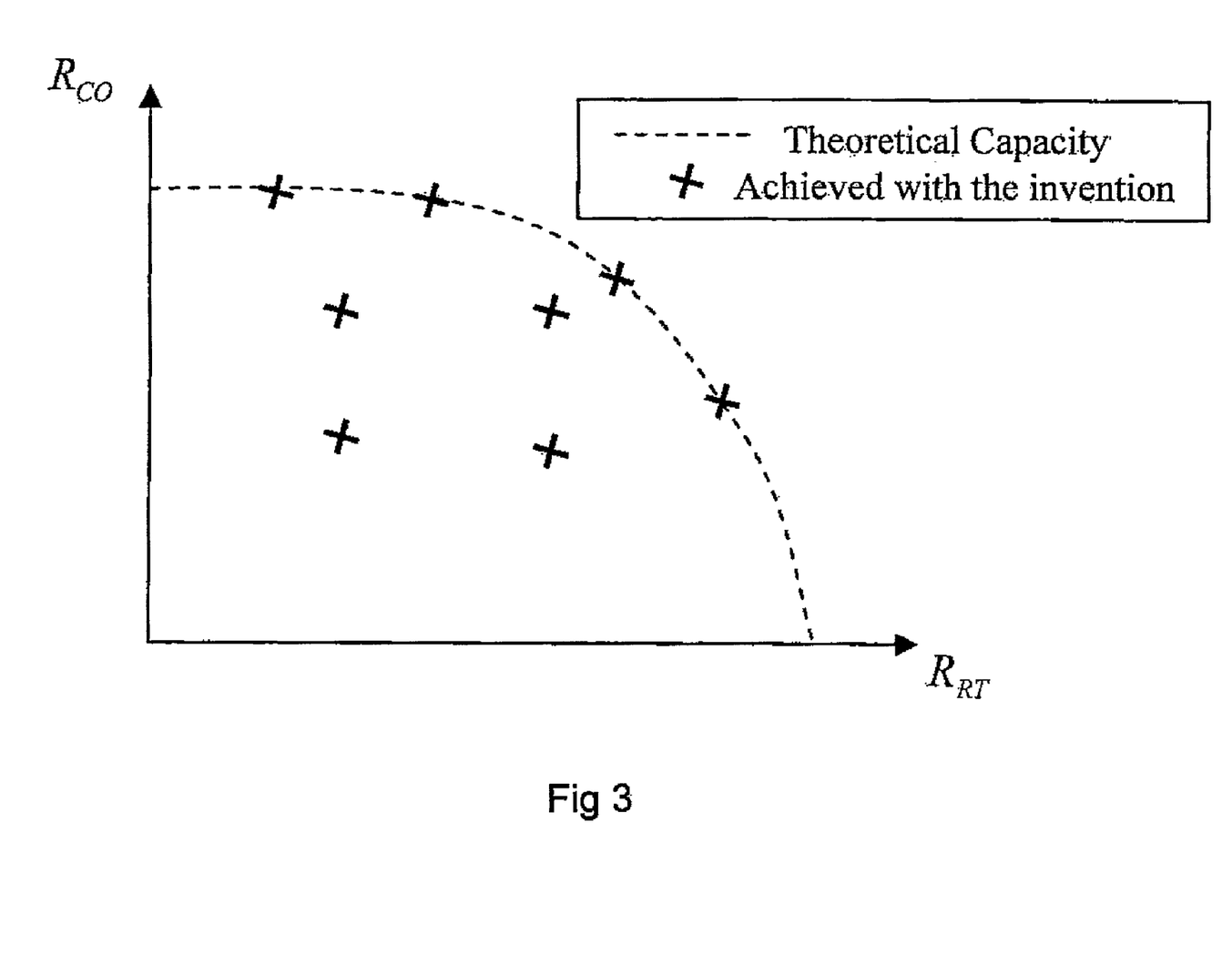
FIG. 3 shows an example of points mapped with the present invention for a scenario of interest.

Further, the dotted line in FIG. 3 shows the theoretical data rate capacity of operational points in which the best balance between the data rate of each user, i.e. the data rate of the Central Office $R_{CO}$ and the Remote Terminal $R_{RT}$, respectively, and the crosstalk emission of each user can be achieved with an optimal solution for the RMP given a specific combination of maximum powers $P_n^{max}$ for both transmission lines 21, 22, i.e. users. For each of the points in the curve both transceiver units 23 and 24 use their maximum power. Points beyond this rate curve are known to be non-feasible, unless maximum power is increased for at least one line.

With the present invention border points of the achievable data rate region can be reached, as shown in FIG. 3. FIG. 3 shows examples of points mapped with the present invention, marked with crosses, for the scenario of interest.

FIG. 3 also shows four exemplary points in the interior of the data rate region. These points are also reached with the method. Other state-of-the-art methods could also map them, but only with additional steps of calculations to decrease the maximum power to be allocated in the system. Adding such additional steps would result in a considerable increase in complexity. By using the method of the present invention, it is possible to get to these points directly, iterating through only one loop (step 4 to 8). The outer loop remains unnoticed while searching for these points, since no adjustment of the weights, $w_n$, of the users is necessary. Several points in the interior of the data rate region for the system, depicted in FIG. 2, are achieved with the method. Running the method for each of these points yields a set of total allocated powers, i.e. the total allocated power of user n across all tones, $P_n^{tot}$, for all users. If the set of the total allocated powers is used as input for an optimal solution for the RMP, one would notice that the results are identical to those of the proposed method. This fact demonstrates the optimality of the proposed method for the PMP.

If a point in the interior of the data rate region is reached, the required data rate in the system can be accomplished with less power than maximum allowed transmission power with the present method. The system operator may use the spare power for incrementing noise margin or may not use it at all, thereby obtain a less noisy binder and decreased cooling requirements.

Figure 4:
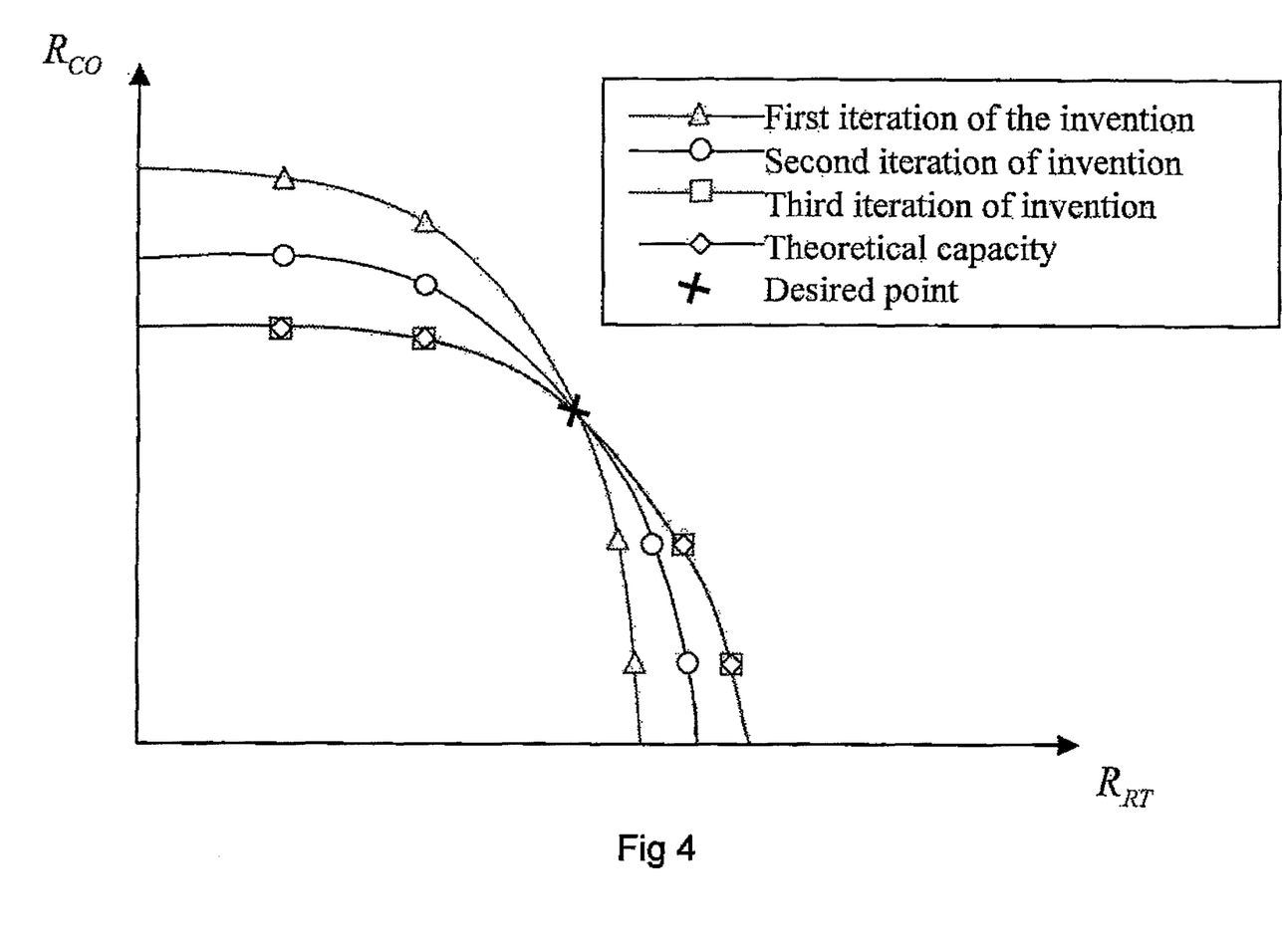
FIG. 4 shows an example of different rate curves achieved with the sequence of iterations of the present invention.

The proposed method is not limited to finding only a subset of the rate region. As depicted in FIG. 3, the method according to the present invention allows navigation through the whole theoretical achievable data rate region, including interior and border points, iteration in only two loops. For a given point at the border of the data rate region, the first iteration of the innermost loop of the method, i.e. step 4 to 8, will converge to a situation in which one user has its power budget violated. The outer loop, i.e. step 3 to 13, will then correct the weights of the users in order to avoid the power budget violation. The sequence of iterations will then find appropriate weights in the outer loop such that the inner loop can converge to a situation in which the power constraint of each user is respected. FIG. 4 illustrates the sequence of iterations of the method and the different regions achieved with each one.

Although all presented details are explained in relation to DSL transmission systems, application is not limited to only them, but to all multi-tone transmission systems, which satisfy the smooth channel response condition.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method performed by a transmitter unit in a multi-tone transmission-based communication system for determining a Power Spectral Density (PSD) of a plurality of users over a physical channel for at least one tone, wherein each of the plurality of users has a minimum required data rate and a maximum allowed power, wherein the method comprises the sequential steps of:

a) initializing a weight ($w_n$) for each user;

b) initializing a Lagrange multiplier ($\mu_n$) for each user;

c) determining a PSD over the physical channel for at least one tone such that the PSD of all users over the physical channel for said at least one tone minimizes a Lagrangian formulation regarding power, wherein the Lagrangian formulation comprises the weight and the multiplier;

d) determining an achieved data rate for each user based on the determined PSD;

e) adjusting the Lagrange multiplier of each user;
f) without adjusting the weight of each user, iterating steps c) to e) until the achieved data rate of each user is equal to the minimum required data rate of each user respectively;
g) only after the achieved data rate of each user is equal to the minimum required data rate of each user, determining the total allocated power of each user;
h) adjusting the weight of each user; and
i) iterating steps c) to h) until the total allocated power of each user on at least one tone is less than or equal to the maximum allowed power of each user.

2. The method according to claim 1, wherein the Lagrangian formulation is a summation of the power of each user on the tone of all users multiplied by the weight ($w_n$) minus a summation of the bit-loading of each user on the tone of all users multiplied by the Lagrange multiplier ($\mu_n$).

3. The method according to claim 1, wherein the step of adjusting the Lagrange multiplier ($\mu_n$) of each user includes adjusting the Lagrange multiplier according to the difference between the achieved data rate and the minimum required data rate multiplied by a step value.

4. The method according to claim 1, wherein the step of adjusting the weight ($w_n$) of each user includes adjusting the weight of each user according to the difference between the total transmit power of the user across all tones and the maximum allowed power of the user multiplied by a step value.

5. The method according to claim 1, wherein the multi-tone transmission-based communication system is a Digital Subscriber Line (DSL) system.

6. A transmitter unit in a multi-tone transmission-based communication system for determining a Power Spectral Density (PSD) of a plurality of users over a physical channel for at least one tone wherein each of the plurality of users has a minimum required data rate and a maximum allowed power wherein the transmitter unit is configured to sequentially perform the following steps:
a) initialize a weight ($w_n$) for each user;
b) initialize a Lagrange multiplier ($\mu_n$) for each user;
c) determine a PSD over the physical channel for at least one tone such that the PSD of all users over the physical channel for said at least one tone minimizes a Lagrangian formulation regarding power, wherein the Lagrangian formulation comprises the weight and the multiplier,
d) determine an achieved data rate for each user based on the determined PSD;
e) adjust the Lagrange multiplier of each user;
f) without adjusting the weight of each user, iterate steps c) to e) until the achieved data rate of each user is equal to the minimum required data rate of each user respectively;
g) only after the achieved data rate of each user is equal to the minimum required data rate of each user, determine the total allocated power of each user;
h) adjust the weight of each user; and
i) iterate steps c) to h) until the total allocated power of each user on at least one tone is less than or equal to the maximum allowed power of each user.

7. The transmitter unit according to claim 6, wherein the Lagrangian formulation is a summation of the power of each user on the tone of all users multiplied by the weight ($w_n$) minus a summation of the bit-loading of each users on the tone of all users multiplied by the Lagrange multiplier ($\mu_n$).

8. The transmitter unit according to claim 6, wherein the transmitter unit is configured to adjust the Lagrange multiplier ($\mu_n$) for each user according to the difference between the achieved data rate and the minimum required data rate multiplied by a step value.

9. The transmitter unit according to claim 6, wherein the transmitter unit is configured to adjust the weight ($w_n$) of each user according to the difference between the total transmit power of the user across all tones and the maximum allowed power of the user multiplied by a step value.

10. The transmitter unit according to claim 6, wherein the multi-tone transmission-based communication system is a Digital Subscriber Line (DSL) system.

* * * * *

UNITED STATES PATENT AND TRADEMARK OFFICE
CERTIFICATE OF CORRECTION

PATENT NO. : 8,238,545 B2
APPLICATION NO. : 12/444823
DATED : August 7, 2012
INVENTOR(S) : Dortschy et al.

Page 1 of 2

It is certified that error appears in the above-identified patent and that said Letters Patent is hereby corrected as shown below:

On the Face Page, in Field (57), under "ABSTRACT", in Column 2, Line 1, delete "multi-tone" and insert -- multi-tone, --, therefor.

On the Face Page, in Field (57), under "ABSTRACT", in Column 2, Line 2, delete "system" and insert -- system, --, therefor.

On the Face Page, in Field (57), under "ABSTRACT", in Column 2, Line 3, delete "system" and insert -- system, --, therefor.

On the Face Page, in Field (57), under "ABSTRACT", in Column 2, Line 7, delete "mathematically" and insert -- mathematically, --, therefor.

On the Face Page, in Field (57), under "ABSTRACT", in Column 2, Line 8, delete "multipliers" and insert -- multipliers, --, therefor.

In Column 8, Line 31, delete "$-\sum_{n}\mu_n R_n\Big)\Big]\cdot$" and insert -- $-\sum_{n}\mu_n R_n\Big]\cdot$ --, therefor.

In Column 9, Line 32, delete "$\mu_u$" and insert -- $\mu_n$ --, therefor.

In Column 10, Line 29, delete "$\varepsilon_w.$" and insert -- $\varepsilon_w$ --, therefor.

In Column 13, Line 4, in Claim 1, delete "user" and insert -- user, --, therefor.

In Column 13, Line 35, in Claim 6, delete "tone" and insert -- tone, --, therefor.

In Column 13, Line 36, in Claim 6, delete "power" and insert -- power, --, therefor.

Signed and Sealed this
Fifth Day of February, 2013

Teresa Stanek Rea
*Acting Director of the United States Patent and Trademark Office*

CERTIFICATE OF CORRECTION (continued)
U.S. Pat. No. 8,238,545 B2

In Column 14, Line 6, in Claim 6, delete "multiplier," and insert -- multiplier; --, therefor.

In Column 14, Line 12, in Claim 6, delete "user" and insert -- user, --, therefor.